No. 896,624. PATENTED AUG. 18, 1908.
W. CHRISTIE.
MOTOR VEHICLE.
APPLICATION FILED FEB. 12, 1908.
5 SHEETS—SHEET 1.
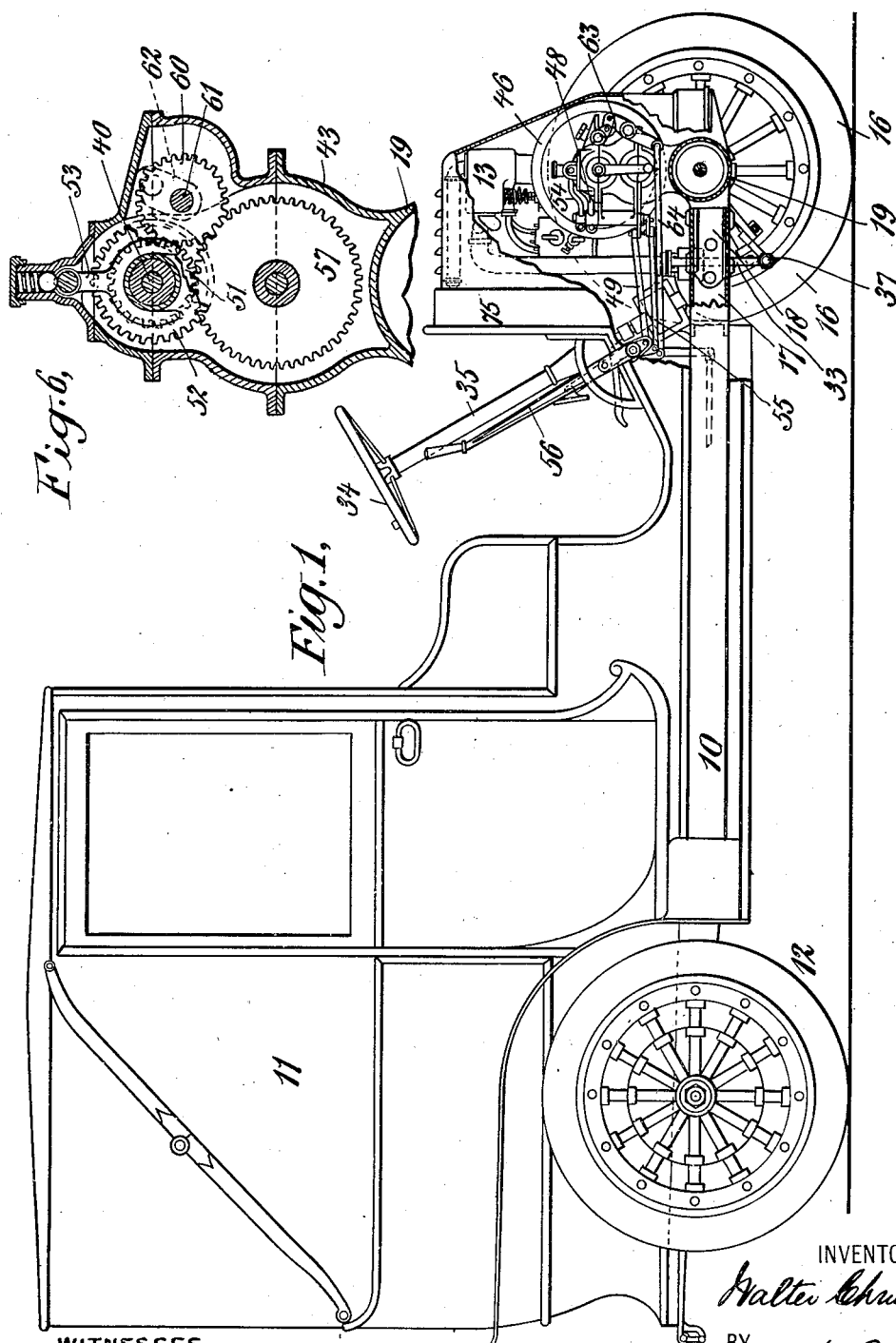
WITNESSES
L. S. Andrews Jr
F. Graves
INVENTOR
Walter Christie
BY
Chapin & Wayson
his ATTORNEYS

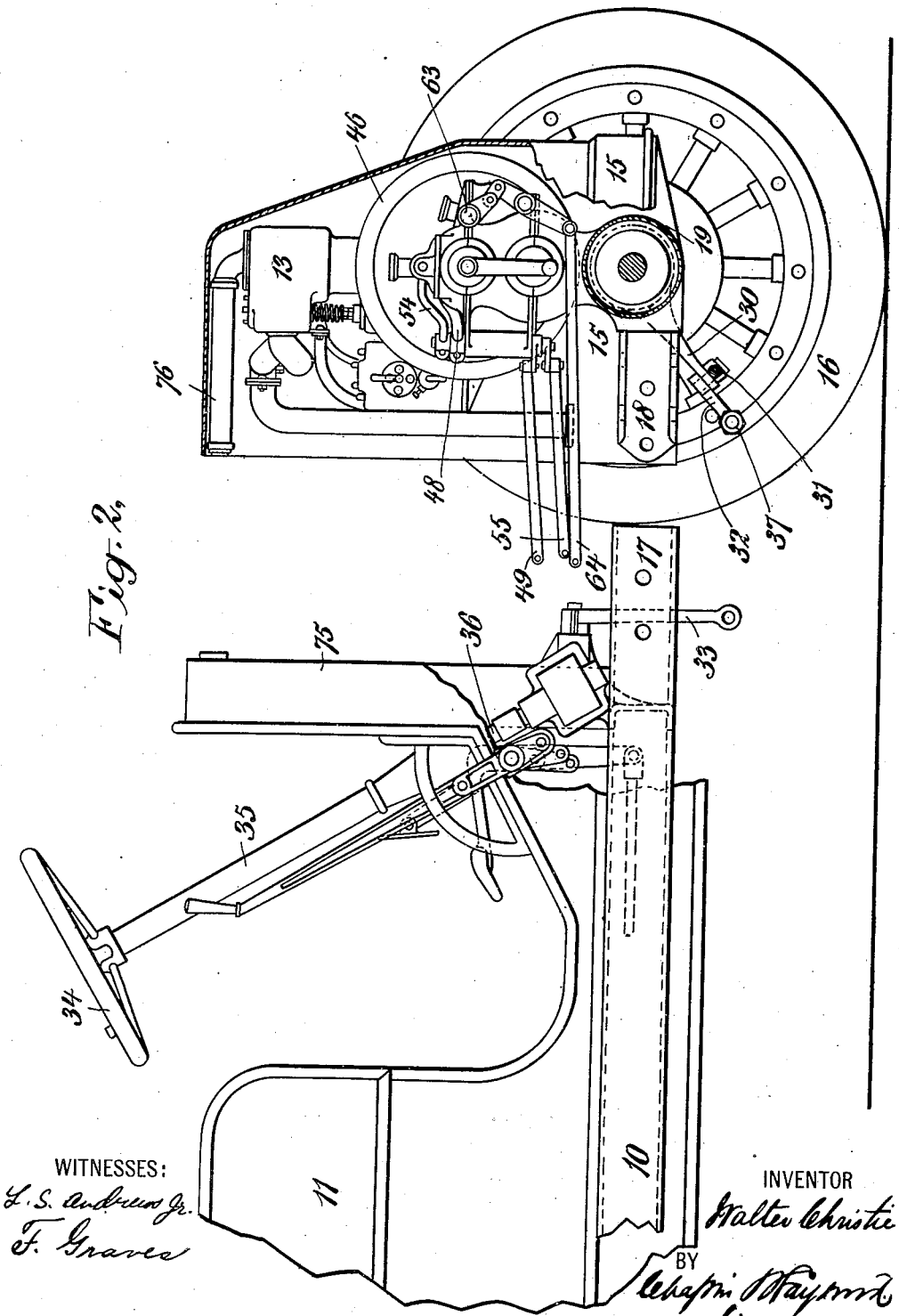

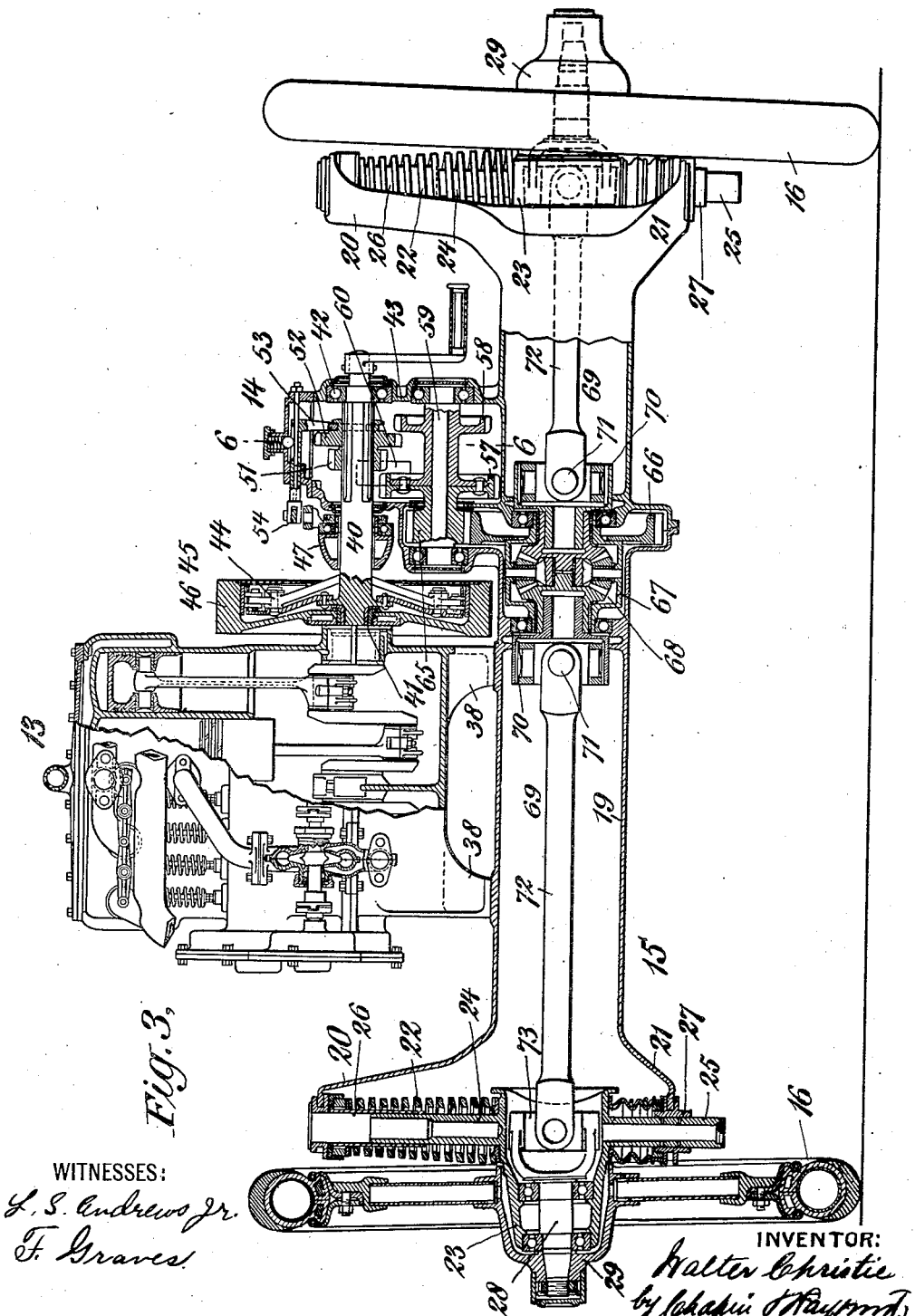

No. 896,624. PATENTED AUG. 18, 1908.
W. CHRISTIE.
MOTOR VEHICLE.
APPLICATION FILED FEB. 12, 1908.
5 SHEETS—SHEET 4.
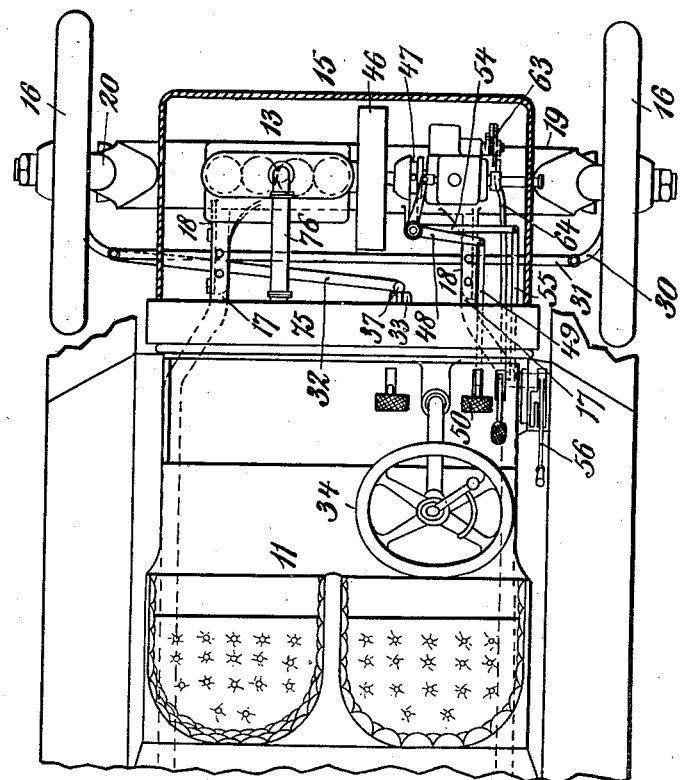
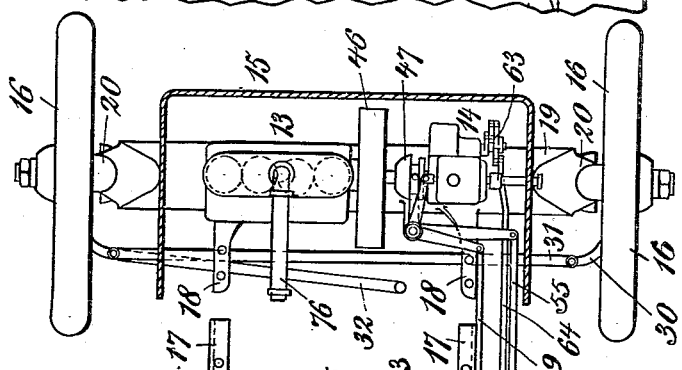
WITNESSES:
INVENTOR
Walter Christie
BY
his ATTORNEY

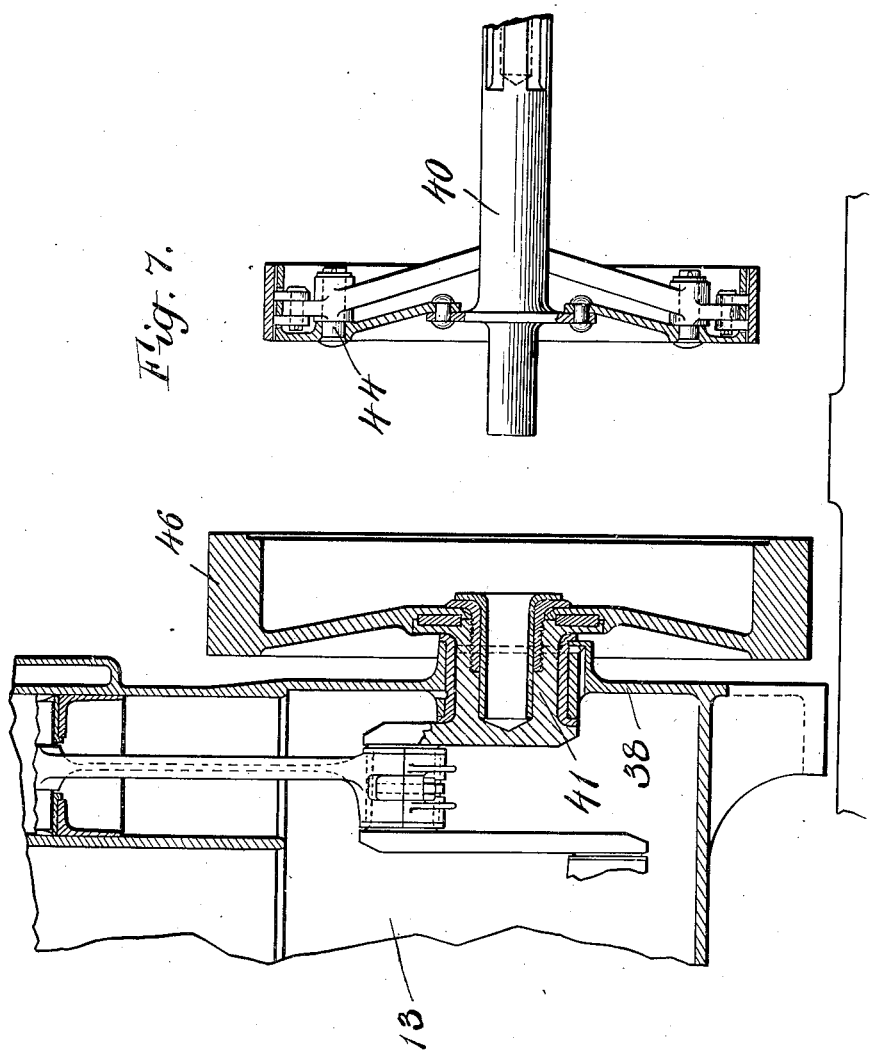

UNITED STATES PATENT OFFICE.

WALTER CHRISTIE, OF NEW YORK, N. Y., ASSIGNOR OF ONE-HALF TO W. GOULD BROKAW, OF ARCHDALE, NORTH CAROLINA.

MOTOR-VEHICLE.

No. 896,624.  Specification of Letters Patent.  Patented Aug. 18, 1908.

Application filed February 12, 1908. Serial No. 415,548.

*To all whom it may concern:*

Be it known that I, WALTER CHRISTIE, a citizen of the United States of America, and a resident of New York, county and State of New York, have invented certain new and useful Improvements in Motor-Vehicles, of which the following is a specification, reference being had to the accompanying drawings, forming a part thereof.

My invention relates to improvements in motor vehicles, and particularly to motor vehicles in which both the driving and steering is done through the front wheels.

My invention consists, first, in a novel arrangement and construction of parts wherein the entire driving mechanism including the motor, the transmission gearing and the front wheels may be readily disconnected from the main or body portion of the vehicle, without the parts, included in the said driving mechanism being dismantled as to themselves. In other words, I construct the vehicle, as a whole, in two separate and distinct parts, one part including the carriage body and the rear wheels, and the other including an independent frame, the motor, the transmission gearing and the front driving wheels. The frame work of the vehicle body, and the frame work of the driving mechanism portion are fitted together and are adapted to be secured in place by removable bolts, and the various links, levers and pipe connections which necessarily run from one member of the vehicle to the other, are also arranged to be conveniently connected and disconnected for the same purpose.

My invention also consists in certain novel details of construction and combinations of parts tending toward the simplification of the mechanism and toward rendering the various parts accessible and facilitating the dismantling and reassemblage of the different parts when required.

It is the main purpose of my present invention to provide a vehicle for commercial purposes wherein the various parts may be readily repaired, renewed or replaced in the shortest possible time, so that vehicles will not be out of commission at any time for any long period. Where the repairs, changes, or the like are but small, they may be made directly to the vehicle as a whole without dismantling the same, or disassociating its members, but where work is involved that will take any considerable time, it is intended that the entire front portion, including the motor, transmission gearing, and front wheels shall be removed bodily, and a similar piece of mechanism substituted therefor. In this way, by keeping one or more spare sets of driving mechanisms in the garage, repairs may be conducted leisurely where they are extensive without thereby causing the disuse of the vehicles in their entirety. Furthermore, it will readily be understood that when the front and rear portions are disassociated, the front portions will be very much more easily handled by themselves, owing to the fact that the bulk thereof is inconsiderable with respect to the bulk of the vehicle as a whole.

In order that my invention may be fully understood, I will now proceed to describe an embodiment thereof, having reference to the accompanying drawings illustrating the same, and will then point out the novel features in claims.

In the drawings: Figure 1 is a view in side elevation of a motor vehicle embodying my invention, a portion of the outer casing of the driving mechanism being broken away in order to show parts contained within the casing. Fig. 2 is a view partially in side elevation and partially in vertical section of the front portion of a vehicle, showing the driving mechanism as removed from the body portion of the vehicle. Fig. 3 is a view in partial rear elevation, and partial central, vertical, transverse section through the driving mechanism, the plane of the section passing through the axial centers of the said front driving wheels. Fig. 4 is a top view of the front part of the vehicle with the casing or hood for the motor and transmission gearing shown in horizontal section. Fig. 5 is a similar view but with the parts including the driving mechanism detached from the body portion of the vehicle. Fig. 6 is a detail cross sectional view through a portion of the transmission gearing, the plane of section being substantially upon the line 6—6 of Fig. 3. Fig. 7 is a detail view on an enlarged scale of certain parts showing the construction which permits the motor to be readily removed from engagement with the transmission gearing.

The vehicle, as a whole, comprises two members; the first including a frame work 10, the carriage body 11 and the rear wheels 12, and the second, including the motor 13, transmission gearing 14, frame work 15, and the front wheels 16. The first said member, I will hereinafter refer to as the main body portion or member of the vehicle, and the second member, I will hereinafter refer to as the driving mechanism or tractor member of the vehicle. The frame work 10 of the body portion of the vehicle includes two longitudinally disposed channel irons having forwardly projecting portions 17. These portions are fitted to rearwardly projecting lugs 18 which form a part of frame work 15 of the tractor member. The lugs 18 are arranged to slide into the forwardly projecting ends of the channel irons 17, and the said channel iron ends and lugs are provided with corresponding holes for the reception of bolts by which the parts may be clamped together. For the purpose of giving strength and rigidity to the structure a plurality of the said bolts and nuts, preferably six for each side of the vehicle, are employed, the said bolts passing through the flanges in the web of the channel irons, and through corresponding portions of the said lugs.

The lugs 18 of the tractor member are here shown as cast integrally with a hollow cross casing 19 which constitutes a support for the motor 13 and transmission gearing 14, and is itself supported by the front wheels 16. The manner of such latter support is as follows:

The casing 19 at opposite ends thereof is provided with upper and lower horns 20 and 21, the said upper horns 20 resting upon springs 22 which in turn are supported by the bearing members 23. The said bearing members are provided with upper and lower vertically disposed guiding spindles 24—25 upon which sleeves 26—27 carried by the said horns 20 and 21 respectively are fitted to slide.

The bearing members 23 are rotatively mounted upon short shaft sections 28 secured to the wheels 29, the hub of the wheels 29 being hollowed or dished so as to receive portions of the bearing member 23 and thus to bring the point of connection between the horns 20—21 and the said bearing members 23 as close as possible to the central plane of the wheels. The connection between the said horns and the bearing member, is, as will be readily understood, a pivotal one, such as will readily permit the wheels to swing for steering purposes about pivots represented by the spindles 24—25. The said bearing members are further provided with arms 30 which project rearwardly therefrom, the said arms of opposite wheels being connected by means of a link 31 whereby the said wheels will be caused to move together, such movements being transmitted thereto through the medium of a link 32 which is pivotally connected at one end to one of the arms 30, or to the link 31, and at the other end to an arm 33 which is arranged to be moved laterally by the usual or any desired form of steering gear including a hand wheel 34, a supporting stem 35, a spindle 36 and suitable means for converting rotary movements of the spindle 36 into lateral movements of the arm 33. The connection 37 between the link 32 and the arm 33 is arranged to be readily coupled and uncoupled whereby the said connection may be uncoupled whenever it is desired to remove the tractor member from the body portion of the vehicle.

The motor 13, as before stated, is supported upon the hollow cross casing 19. In the present instance, the said motor is a four cylinder internal combustion engine, detail description thereby being unnecessary as the said engine *per se* forms no part of the present invention. Attention is called, however, to the fact that the said engine or motor is an entirely self-contained integral structure which may be removed bodily from the casing 19 without the necessity of further dismantling the remainder of the mechanism. The frame work of the motor has supporting lugs 38 which are arranged to be directly bolted to portions of the casing 19 fitted to receive them. By merely removing these bolts, the engine or motor may be removed bodily and another one substituted therefor, if desired.

The transmission gearing includes shaft 40 arranged in line with the crank shaft 41 of the engine, the inner end of the said shaft 40 having a reduced portion which is fitted into the hollow end of the said shaft 41, such connection forming a bearing for the said shaft at this end. The adjacent ends of the motor shaft 41 and the transmission gearing shaft 40 are shown in detail on an enlarged scale in Fig. 7 of the drawings. By an inspection of this figure, it will be seen that the parts are so arranged and constructed that they may be assembled or disassembled by merely placing them together or pulling them apart, hence removal of the motor in its entirety will in no way be impeded by reason of the normal connection therewith of the transmission gearing shaft. When the bolts which secure the motor to the casing are removed, it is only necessary to pull the motor longitudinally away from the transmission gearing including the shaft 40 in order to free it entirely from the said mechanism. At its opposite end, the said shaft 40 is provided with a ball bearing 42 which is supported in a housing 43, formed as a part of, or secured to the hollow cross casing 19. At its inner end, the said shaft 40 carries the expanding member 44 of a clutch 45, the other member of which is comprised in the fly wheel of the engine. The said clutch is operated by means of a sliding collar 47 arranged upon the shaft 40, the said collar being engaged by one arm of a bell-crank lever 48, the other arm of which is connected by a suitable link connection 49 with a pedal 50.

Mounted upon the shaft 40 intermediately between its ends, and within the housing 43, are two gear wheels 51 and 52. These gear wheels are secured together and are rotatively mounted upon the said shaft 42, but they are splined to the said shaft 42 whereby they may slide freely thereon in a longitudinal direction. Such longitudinal movements are imparted to the said gear wheels by means of a sliding member 53 which is provided with a downwardly projecting arm engaging a cylindrical groove in a hub of the said gear wheels, the said sliding member 53 being engaged by one arm of a bell-crank lever 54, the other arm of which is connected by a suitable link connection 55, with a change speed and reverse lever 56. The gear wheels 51 and 52 are shown in Fig. 3 of the drawings in a neutral position with respect to two gear wheels 57 and 58 with which they are adapted to engage when moved in one direction or the other from such neutral position. When moved to the left, as viewed in Fig. 3, the gear wheel 51 will be caused to engage the gear wheel 57, and because of the relative size of the two said gear wheels, relatively slow movements will be imparted to the intermediate shaft 59 upon which the gear wheels 57 and 58 are mounted. When, on the other hand, the gear wheels 51—52 are moved over to the right, as viewed in Fig. 3, the gear wheel 52 will be caused to intermesh with the gear wheel 58, and relatively faster movements will be imparted to the said intermediate shaft 59 owing to the fact that the gear wheel 52 is larger than the gear 51, and the gear wheel 58 is smaller than the gear wheel 57. As before stated, however, the gear wheels 51 and 52 are when in the position shown in Fig. 3 of the drawings in a neutral position. They are arranged to be in this position when it is desired to disconnect the gear wheels altogether, or when it is desired to transmit reverse movements of drive from the shaft 40 to the intermediate shaft 59. For this purpose, an idler gear 60 is arranged in proximity to the gear wheels 51 and 57 being normally out of mesh therewith. The said gear wheel is mounted upon a stub shaft 61 which is carried by an arm 62, the said arm being supported upon a rock shaft 63 which is connected by suitable links and levers including a connecting link 64 with the change speed and reverse lever 56. By a proper manipulation of this lever, the shaft 63 may be rocked so as to throw the idler gear into mesh with the gear wheels 51 and 57 at such time as the gear wheels 51 and 52 are in their neutral position. This will have the effect of connecting the gearing in such a way as to transmit slow rearward movements to the said intermediate shaft 59.

Mounted upon the shaft 59 and secured fast to the gear wheels 57 and 58 is a pinion 65 which is arranged in constant mesh with a spur driving gear 66. The spur driving gear is mounted upon a casing 67 of any suitable or well known compensating gearing 68 and through which driving movements are imparted to the driving wheels 16. The connection between the compensating gearing and the wheels is through universal joint connections 69—69 whereby the casing may be permitted to have vertical movements such as are permitted thereto by the springs 24, and the said wheels will be permitted to have steering movements such as are permitted by the pivotal connection of their bearing members with the casing, all without interfering in any way with the drive. Each of the said universal joint connections includes a telescopic member 70, a universal joint 71 comprising elements pivoted together by two axles at right angles to each other, a shaft section 72, and a similar universal joint 73 which connects with the short wheel shaft sections 28.

From the foregoing, it will be seen that the entire driving mechanism including the motor, the transmission gearing, a frame work therefor, and the front wheels of the vehicle, which are combined driving and steering wheels, is included in a single integral self-contained structure. The links 49, 55 and 64 which connect with the controlling and operating means, may be readily connected and disconnected at will when the tractor member, as a whole, is desired to be connected or disconnected with the body member of the vehicle, the said tractor member, in its entirety, being shown in Figs. 2 and 5 as disconnected, while in Figs. 1 and 4 it is shown as connected.

The radiator 75 for cooling the water for the water jacket of the motor may conveniently be contained in the body portion of the vehicle, suitable hose pipe connection 76 being provided therefor such as may be readily connected and disconnected, and it will, of course, be understood that other pipe connections such as may be conveniently and quickly coupled and uncoupled may be employed for such other purposes as may be found desirable or necessary.

What I claim is:

1. In a motor vehicle, the combination with a hollow tubular cross casing provided with vertical bearing sleeves at opposite ends thereof and having rearwardly projecting lugs, bearing members having spindles fitted to the said vertical sleeves, wheels rotatably mounted upon said bearing members, a motor supported upon the said cross casing and transmission gearing including compensating means for connecting the said motor with the said wheels, of a main body portion including a frame work and a pair of rear wheels, the said frame work provided with forwardly projecting channel irons which are fitted to the rearwardly projecting lugs of the cross casing; and means for removably connecting the said lugs and channel irons together.

2. In a motor vehicle, the combination with a hollow tubular cross casing provided with vertical bearing sleeves at opposite ends thereof, bearing members having spindles fitted to the said sleeves, and wheels rotatably mounted upon said bearing members, of a motor, removably supported in its entirety upon the said cross casing, and transmission gearing including compensating means for connecting the said motor with the said wheels, the compensating means being contained and inclosed within the said hollow cross casing.

3. In a motor vehicle, the combination with a hollow tubular cross casing provided with horns at its opposite ends, the said horns being provided with upper and lower vertical sleeves, bearing members provided with spindles fitted to the said bearing sleeves, springs surrounding the said upper spindles, and extending between the upper horns and the bearing members, and driving wheels rotatably mounted upon the said bearing members, of an independent self-contained motor removably supported upon the said casing at the exterior thereof, and transmission gearing including a shaft arranged in line with the shaft of the said motor, compensating gears disposed within the said hollow tubular casing, and universal joint connections connecting the said compensating gears with the said wheels.

4. In a motor vehicle, the combination with a hollow tubular cross casing provided with vertical bearing sleeves at opposite ends thereof, bearing members having spindles fitted to the said sleeves, wheels rotatably mounted upon said bearing members, a motor removably supported in its entirety upon the said cross casing, and transmission gearing including compensating means for connecting the said motor with the said wheels, of a main body portion including a frame work and a pair of rear wheels, the said frame work provided with forwardly projecting channel irons and the said cross casing having rearwardly projecting lugs secured thereto; and means for removably connecting the said lugs and channel irons together.

5. A motor vehicle comprising two independent separable members, one including the body portion of a vehicle, a frame work, a pair of rear wheels, and operating means including a steering device, levers and pedals, and the other including a frame work adapted to be removably secured to the frame work of the body portion, a motor, a pair of combined steering and driving wheels, and transmission gearing including a change speed device, reverse gear, a clutch, and means connecting with the wheels for imparting steering movements thereto, the said change speed device, reverse gear, clutch, and steering means each having an element adapted to be removably connected with the operating parts carried by the said body portion of the vehicle.

6. In a motor vehicle, the combination with a hollow tubular cross casing provided with horns at its opposite ends, the said horns being provided with upper and lower vertical sleeves, bearing members provided with spindles fitted to the said bearing sleeves, and wheels rotatably mounted upon the said bearing members, of a motor removably supported in its entirety upon the said cross casing, a gearing shaft arranged in line with the shaft of the said motor, a clutch between the two said shafts, sliding gears mounted upon the said gearing shaft, an intermediate shaft, gears thereon adapted to be engaged by the said sliding gears, compensating gearing disposed within the said hollow tubular cross casing, a gear connection between the said compensating gearing and the said intermediate shaft, and universal joint connections connecting the said compensating gearing with the said wheels.

WALTER CHRISTIE.

Witnesses:
W. G. BROKAW,
D. HOWARD HAYWOOD.